United States Patent [19]

Kafchinski et al.

[11] Patent Number: 5,213,689
[45] Date of Patent: May 25, 1993

[54] ASYMMETRIC FLUOROPOLYMER-COATED POLYOLEFIN HOLLOW FIBERS

[75] Inventors: Edward R. Kafchinski, Winfield; Tai-Shung Chung, Randolph, both of N.J.

[73] Assignee: Hoechst Celanese Corp., Somerville, N.J.

[21] Appl. No.: 818,016

[22] Filed: Jan. 8, 1992

[51] Int. Cl.⁵ .............................................. B01D 71/32
[52] U.S. Cl. .................. 210/500.23; 55/158; 210/500.36; 264/45.1
[58] Field of Search ............... 55/16, 158; 210/500.21, 210/500.27, 500.36, 500.23; 264/41, 45.1

[56] References Cited

U.S. PATENT DOCUMENTS 4,230,463 10/1980 Henis et al. ............................ 55/16

Primary Examiner—Frank Sever
Attorney, Agent, or Firm—Joseph M. Mazzarese

[57] ABSTRACT

Asymmetric hollow fibers having a microporous hollow fiber core comprising a polyolefin, e.g. polypropylene, and an asymmetric coating comprising a fluoropolymer, e.g. SIXEF ™-Durene. Optionally, the coating may also comprise glycerine which is applied prior to the fluoropolymer. The fibers are coated by wet-spinning, or alternately by dry jet-wet spinning, through a spinning jet in which a fluoropolymer-containing fluid is applied to the outer surface of the fibers as they pass through the jet. The fibers exit the jet into a water bath. If greater selectivity is needed, the fiber later may be coated with an additional layer of a highly selective material, e.g. polyvinyl alcohol, PVP, and the like.

17 Claims, 1 Drawing Sheet

ASYMMETRIC FLUOROPOLYMER-COATED POLYOLEFIN HOLLOW FIBERS

BACKGROUND OF THE INVENTION

This invention relates to the field of hollow fiber production, especially to fluoropolymer-coated polyolefin hollow fibers for use in fluid separation membranes and a process for making same.

In creating a gas or liquid separation membrane, it is desirable to have both a high rate of permeation or throughput and a high separation factor. This combination of characteristics permits the effective separation of a relatively large volume of fluid per unit time. Large rates of permeation also allow the membrane to be operated at lower pressures, which improves cost-effectiveness.

Highly porous membranes tend to be very permeable, but do a poor job of separating fluids into their components. Less porous, dense membranes can be more selective, but at the cost of reduced throughput.

Asymmetric membranes generally have a thin, dense separation layer and a less dense, more permeable layer. These asymmetric membranes are often chosen for separation applications because they may provide a good combination of permeation and separation. Hollow fibers having a dense skin and a porous body can be used to make such membranes.

Unfortunately, many of the materials, e.g. fluoropolymers, used to make hollow fluid separation fibers is relatively expensive. Some processes are also expensive, particularly if many process steps are needed. Furthermore, in some fibers the permeability, the separation factor, or both may be rather low.

U.S. Pat. No. 4,230,463 issued to Henis, et al. describes multi-component membranes for gas separations wherein a porous membrane is coated with another substance. The coating is said to enhance the separation capability of the membrane.

U.S. Pat. No. 4,290,987 issued to Soehngen, et al., describes a process for making microporous hollow fibers comprising a polyolefin by solvent stretching a nonporous hollow precursor fiber having a controlled degree of molecular orientation.

U.S. Pat. No. 4,871,494 issued to Kesting, et al. describes a process for forming asymmetric gas separation membranes having graded density skins.

U.S. Pat. No. 4,756,932 issued to Puri describes a process for making highly permeable coated composite hollow fiber membranes. The hollow fiber substrate is passed continuously through a polymeric coating solution and withdrawn through a coating die to form a uniform coating.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. patent application Ser. No. 686,739 filed on Apr. 17, 1991 by Chung, et al. describes a method for making asymmetric hollow fibers from fluoropolymers. The outer layer of these fibers is coated with a highly permeable substance to achieve high selectivities.

U.S. patent application Ser. No. 738,996 filed on Aug. 1, 1991 by Chung, et al. describes an asymmetric hollow fiber consisting essentially of SIXEF TM -Durene, a polyimide made from 2,2-bis[3,4-dicarboxyphenyl] hexafluoropropane dianhydride and 2,3,5,6-tetramethylphenylene diamine monomers.

U.S. patent application Ser. No. 739,063 filed on Aug. 1, 1991 by Chung, et al. describes an asymmetric hollow fiber made from SIXEF TM -Durene coated with poly-4-vinylpyridine ("PVP").

The disclosures of the foregoing references are incorporated by reference. Although they are not necessarily prior art, these references do reflect the present state of the art.

SUMMARY OF THE INVENTION

The present invention comprises asymmetric hollow fibers having a microporous hollow fiber core comprising a polyolefin, e.g. polypropylene or polyethylene, and an asymmetric coating comprising a fluoropolymer, e.g. SIXEF TM -Durene (a polyimide made by Hoechst Celanese Corporation from 2,2-bis[3,4-dicarboxyphenyl] hexafluoropropane dianhydride and 2,3,5,6-tetramethylphenylene diamine monomers), and a method for making these coated fibers. Optionally, the coating may also comprise glycerine or another glycol. The fibers may be coated further with a layer of a selective material, e.g. polyvinyl alcohol, PVP, and the like.

In a preferred process of this invention, a microporous hollow polyolefin fiber, e.g. polypropylene fiber, is coated with a fluoropolymer by wet-spinning, or alternately by dry jet-wet spinning, the fiber through a spinning jet in which a fluoropolymer-containing fluid is applied to the outer surface of the fiber as the fiber passes through the jet. The fiber exits the jet into a water bath, resulting in the formation of an asymmetric fluoropolymer layer or coating. The fiber later may be coated further with a highly selective layer, for example by dipping the fiber in a solution of polyvinyl alcohol. More preferably, the fiber is pre-wetted with glycerine or other glycol which is applied to the hollow fiber before it enters the spinning jet to receive the fluoropolymer coating.

It is an object of the present invention to provide a microporous hollow polyolefin fiber coated with an asymmetric layer of a fluoropolymer.

It is another object of the present invention to provide a low cost asymmetric fluid separation fiber containing a fluoropolymer.

It is a further object of the present invention to provide a fiber useful in a gas separation membrane.

An additional object of the present invention is to provide an asymmetric fiber that has the permeability and the separation power to efficiently isolate oxygen from air.

It is also an object of the present invention is to provide an asymmetric fiber that has the permeability and the separation power to efficiently isolate nitrogen from air.

Still another object of the present invention is to provide a hollow fiber coated with a layer of fluoropolymer on which is coated a layer of polyvinyl alcohol or other high selectivity material.

Another object of the present invention is to provide a method for coating polyolefin fibers to produce the novel fibers of this invention.

Other objects and advantages of the present invention will be apparent to those skilled in the art from the following description and from the appended claims and drawing.

DETAILED DESCRIPTION OF THE PREFERRED EMBODIMENTS

Figure 1:
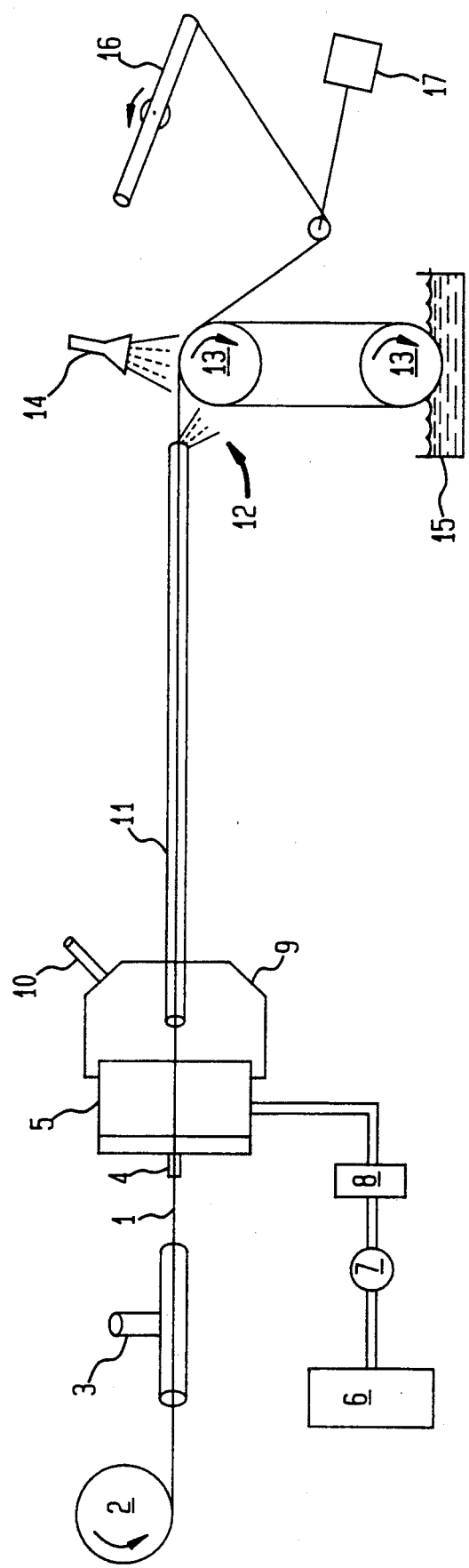
FIG. 1 illustrates a preferred process for coating fibers according to the present invention.

In a preferred embodiment of a process according to the present invention illustrated in FIG. 1, a hollow polyolefin fiber 1 comes off a feed roll 2 and passes through a T-guide 3 in which the fiber 1 picks up glycerine or another surface coating material. The fiber 1 then enters and passes through a die needle guide 4 and a hollow fiber die 5, in which it receives a coating of a fluoropolymer dope. The die 5 is connected to a dope reservoir 6 containing the fluoropolymer dope, from which the dope is fed to the die 5 through a pump 7 and a filter 8.

The coated fiber enters a water reservoir 9 immediately upon exiting the die 5, and then passes through a flow tube 11. Water is continuously fed into the water reservoir 9 through an inlet 10 and flows out of the reservoir 9 into the end of the tube 11 connected thereto. The tube 11 is pitched slightly so that the remote end 12 is slightly higher than the connected end, so that the tube remains filled with water. The water overflow exits the remote end 12, where the fiber 1 also exits the tube 11.

The fiber 1 then winds several times around take-up wash rolls 13 while being kept wet by the water overflowing from the tube 11 and a water spray from a wash nozzle 14. Optionally, a water pan 15 may be used to soak the fiber at the lower end of the rolls 13. The fiber is then collected on a fiber winder 16; a winder speed control device 17 may be used to facilitate the fiber collection process.

In an embodiment wherein the die 5 is vertically oriented, rather than horizontal as in FIG. 1, the water reservoir 9, inlet 10 and tube 11 may be replaced by a V-shaped tube to serve the same functions, or any other equivalent elements. Orientations at an angle between the horizontal and the vertical are also within the scope of this invention. In any of these embodiments, the fiber optionally may be spun using dry jet-wet spinning technology known in the art rather than the illustrated wet spinning method.

Preferably, the coated fibers are soaked or washed in deionized water overnight to remove residuals. The fiber may also be washed well with methanol to remove water and other residuals.

The fibers coated by the process of the present invention are microporous hollow fibers comprising a polyolefin, e.g. polypropylene or polyethylene; for example, CELGARD® fiber, a microporous hollow polypropylene fiber available from Hoechst Celanese Corp., Bridgewater, N.J., may be used in the practice of this invention. The preferred polyolefins to use in this invention consist essentially of repeating units derived from non-aromatic, unsaturated hydrocarbon monomers containing 2-4 carbon atoms.

The coating comprises a fluoropolymer, e.g., SIX-EF ™ -Durene, a polyimide made by Hoechst Celanese Corporation from 2,2-bis[3,4-dicarboxyphenyl] hexafluoropropane dianhydride and 2,3,5,6-tetramethylphenylene diamine monomers.

The fiber may be pre-wetted with glycerine or other glycols, as in the preferred embodiment described above with reference to FIG. 1. Although glycerine is not required in the practice of this invention, it has been found to improve the performance of the asymmetric layer on the coated fiber. The glycerine appears to prevent the hollow fiber pores from clogging with fluoropolymer, and to help the fluoropolymer precipitate to form a uniform asymmetric layer. The resulting fluoropolymer layer comprises two sub-layers, a microporous inner sublayer and a relatively defect-free outer sublayer, which structure contributes to improved permeability and separation characteristics. Those skilled in the art will appreciate that other similar compositions may be substituted for glycerine in the practice of this invention, for example, ethylene glycol or propylene glycol. Suitable pre-wetting compositions should have a high viscosity, be water soluble, and not cause the fluoropolymer to coagulate too quickly.

The asymmetric fluoropolymer layer or coating provides for a more uniform distribution of fluid along the fiber surface because the microporous inner sub-layer of the coating has three-dimensional porosity that allows lateral diffusion of fluids. Consequently, the useful surface area of the fluoropolymer coating is not limited by the porosity of the underlying fiber core.

The fibers my be coated further with a layer of a highly selective material, e.g. polyvinyl alcohol, PVP, and the like. This can be done by simply dip-coating the fluoropolymer-coated fiber into a solution of the selective material, e.g. into a 0.025% to 2.0% aqueous polyvinyl alcohol solution, or by any other conventional means, e.g., by using the polyvinyl alcohol solution as an external coagulant in the spinning process. The fiber may be air-dried overnight to remove water or other solvents, if necessary. It has been found that a polyvinyl alcohol coating increases the selectivity of the fiber while significantly reducing its permeability. Such a selective coating is desirable where high selectivity is needed, for example to separate approximately 95% pure nitrogen from air.

Virtually any type of selective coating known in the art may be coated over the fluoropolymer layer; those skilled in the art will be able to readily identify suitable selective materials. However, if the hollow fiber substrate has too many imperfections, nonaqueous-based coating compositions may be able to penetrate the fiber rather than remain on the surface as a thin coating layer; such penetration would be detrimental to the separation characteristics of the fiber. Of course, whether an additional selective layer is used or not, it is preferred to begin with a fiber having a minimum of imperfections to achieve maximum performance.

The fluoropolymer-coated fiber without an added selective coating layer may be useful in applications where it is desirable to have much higher permeability or throughput, for example, in separating an oxygen-rich gas stream (e.g., about 25-40% $O_2$ or higher) from air such as for a breathing apparatus or similar applications. These fibers typically exhibit an oxygen/nitrogen selectivity ratio in the approximate range of 3.0 to 4.4, and an oxygen permeance in the approximate range of $150$-$600 \times 10^{-6}$ cc(STP)/sec cm2 cm Hg; the selectivity ratio, often represented by the symbol $\alpha$, is equal to the ratio of the permeability of $O_2$ to that of $N_2$. The same fiber coated with polyvinyl alcohol may be expected to have an oxygen permeance in the approximate range of $5$-$10 \times 10^{-6}$ cc(STP)/sec cm2 cm Hg and an $O_2/N_2 \alpha$ in the approximate range of 6.5 to 7.0. However, these figures are merely illustrative; the permeance or selectivity of a fiber of this invention may be higher or lower.

Preferably, both the permeance and the selectivity are as high as possible.

Selectivities and permeance can be calculated from measurements of the flow rates through the fibers at a given temperature and pressure for pure gases, e.g., oxygen and nitrogen.

A preferred fluoropolymer dope for coating the fiber substrate in the practice of this invention is made by dissolving a fluoropolymer, e.g. SIXEF TM -Durene, in a solvent composition containing the solvent NMP. Other fluoropolymers may be used in the practice of the present invention, provided that the polymer has a dielectric constant less than or equal to about 3.0. For example, SIXEF TM -33 (a polyimide made by the Hoechst Celanese Corporation from 2,2-bis[3-aminophenyl]hexafluoropropane and 2,2-bis[3,4-dicarboxyphenyl]hexafluoropropane dianhydride), or SIXEF TM -44, a polyimide made by the Hoechst Celanese Corporation from 2,2-bis[4-aminophenyl] hexafluoropropane and 2,2-bis[3,4-dicarboxyphenyl] hexafluoropropane dianhydride, may be substituted for SIXEF TM -Durene. The fluoropolymer is preferably partially or wholly aromatic, although aliphatic fluoropolymers may be employed. Other liquids miscible with NMP may be included in the solvent composition, such as propionic acid, acetic acid, butyric acid, and the like.

The polymer content of the dope should be sufficient to produce a dope viscosity at 25° C. of at least about 500 poise, preferably at least about 1200 poise. A polymer concentration of about 13-30% by weight or more in the dope may be needed to achieve a desirable viscosity; preferably the polymer concentration is at least about 15%. However, the percentage needed may be more or less depending on the fluoropolymer and the solvent composition.

In the coating process of the present invention, the take-up rolls may draw the fibers at any suitable rate, the rate depending largely on the equipment used. A draw rate of about 3-7 meters/minute has been used successfully, although higher rates are generally desirable for high speed production; a rate of up to 20 m/min or higher may be used, provided that a uniform coating is obtained.

The following Examples are provided to illustrate the present invention; however, the invention is not limited to the embodiments illustrated.

EXAMPLE I

CELGARD TM microporous hollow fiber (Hoechst Celanese Corporation) having a 310 micron outer diameter and a surface porosity of about 5-10% was coated with fluoropolymer using an apparatus of the type shown in FIG. 1. The fluoropolymer dope used to coat the fiber contained 15% by weight SIXEF TM -Durene in a solvent composition containing equimolar amounts of NMP (57% w/w) and propionic anhydride (43% w/w). The coating die had an outer diameter of 33 mils and an inner diameter of 28 mils. A thin layer of glycerine was coated onto the fiber before the fiber entered the die.

The coated fiber was washed with water and collected at a rate of 3 m/min. The fiber was then air-dried. This coated fiber had an oxygen/nitrogen selectivity of 4.0 and an oxygen permeance of $186 \times 10^{-6}$ cc/sec-cm$^2$-cm Hg.

This fiber was subsequently further coated with a high selectivity layer by dipping the fluoropolymer-coated fiber in a 0.25% aqueous solution of polyvinyl alcohol. The fiber was air-dried. The polyvinyl alcohol-coated fiber had an oxygen/nitrogen selectivity of 7.0 and an oxygen permeance of $6.4 \times 10^{-6}$ cc/sec-cm$^2$-cm Hg.

EXAMPLE II

The process of Example I was repeated, with the following results: prior to coating with the polyvinyl alcohol, the fluoropolymer-coated fiber had an oxygen/nitrogen selectivity of 4.3 and an oxygen permeance of $85 \times 10^{-6}$ cc/sec-cm$^2$-cm Hg; after the polyvinyl alcohol-coating this fiber had an oxygen/nitrogen selectivity of 6.9 and an oxygen permeance of $7.2 \times 10^{-6}$ cc/sec-cm$^2$-cm Hg.

EXAMPLE III

CELGARD TM microporous hollow fibers were coated with SIXEF TM -Durene fluoropolymer as set forth in Ex. I. The coated fibers were then bundled together to form a module 21 cm long containing 200 fibers, and the selectivity and permeance properties of the fibers were measured. Two additional modules were made in the same way. The results of these measurements are tabulated below:

|  | $\alpha(O_2/N_2)$ | Permeance |
| --- | --- | --- |
| module 1 | 3.1 | $558 \times 10^{-6}$ cc/sec-cm$^2$-cm Hg |
| module 2 | 3.2 | $310 \times 10^{-6}$ cc/sec-cm$^2$-cm Hg |
| module 3 | 3.7 | $239 \times 10^{-6}$ cc/sec-cm$^2$-cm Hg. |

Many variations of the present invention not illustrated herein will occur to those skilled in the art. The present invention is not limited to the embodiments illustrated and described herein, but encompasses all the subject matter within the scope of the appended claims.

We claim:

1. A hollow fiber useful for fluid separations comprising a polyolefin hollow fiber having an inner surface and an outer surface, and an asymmetric fluoropolymer coating on said outer surface.

2. A hollow fiber according to claim 1 wherein said polyolefin is polypropylene or polyethylene.

3. A hollow fiber according to claim 1 wherein said fluoropolymer contains aromatic groups.

4. A hollow fiber according to claim 1 wherein said fluoropolymer consists essentially of repeating units derived from 2,2-bis[3,4-dicarboxyphenyl] hexafluoropropane dianhydride and 2,3,5,6-tetramethylphenylene diamine monomers.

5. A hollow fiber according to claim 1 further comprising a second coating over said fluoropolymer coating, said second coating comprising a material other than said fluoropolymer.

6. A hollow fiber according to claim 5 wherein said second coating comprises polyvinyl alcohol.

7. A process for making a fluid separation fiber according to claim 1 comprising coating said polyolefin fiber with said fluoropolymer and then immersing said coated fiber in water.

8. A process according to claim 7 further comprising coating said polyolefin fiber with a layer comprising glycerine prior to applying said fluoropolymer coating.

9. A process according to claim 8 further comprising coating said polyolefin fiber with polyvinyl alcohol after applying said fluoropolymer coating.

10. A process according to claim 7 further comprising coating said polyolefin fiber with a layer comprising ethylene glycol, propylene glycol, or glycerine prior to applying said fluoropolymer coating.

11. A process according to claim 10 further comprising coating said polyolefin fiber with polyvinyl alcohol after applying said fluoropolymer coating.

12. A process according to claim 7 further comprising coating said polyolefin fiber with polyvinyl alcohol after applying said fluoropolymer coating.

13. A hollow fiber useful for fluid separations comprising a polyolefin microporous hollow fiber having an asymmetric fluoropolymer coating on its outer surface, wherein said coating consists essentially of repeating units derived from 2,2-bis[3,4-dicarboxyphenyl] hexafluoropropane dianhydride and 2,3,5,6-tetramethylphenylene diamine monomers, and wherein said polyolefin is polypropylene or polyethylene.

14. A hollow fiber according to claim 13 further comprising a second coating over said fluoropolymer coating.

15. A hollow fiber according to claim 13 wherein said second coating comprises polyvinyl alcohol.

16. A hollow fiber useful for fluid separations consisting essentially of a polyolefin hollow fiber having an inner surface and an outer surface, and an asymmetric fluoropolymer coating on said outer surface, wherein said polyolefin is polypropylene or polyethylene and further wherein said fluoropolymer consists essentially of repeating units derived from 2,2-bis[3,4-dicarboxyphenyl] hexafluoropropane dianhydride and 2,3,5,6-tetramethylphenylene diamine monomers.

17. A fiber according to claim 16 further consisting of a second coating over said fluoropolymer coating, said second coating comprising a material other than said fluoropolymer.

* * * * *